United States Patent
De Gaillard

(10) Patent No.: US 6,789,843 B2
(45) Date of Patent: Sep. 14, 2004

(54) ROOF UNIT FOR INSTALLATION IN A MOTOR VEHICLE ROOF

(75) Inventor: Francois De Gaillard, Mouilleron en pareds (FR)

(73) Assignee: Webasto Vehicle Systems International GmbH, Stockdorf (DE)

(*) Notice: Subject to any disclaimer, the term of this patent is extended or adjusted under 35 U.S.C. 154(b) by 0 days.

(21) Appl. No.: 10/316,858

(22) Filed: Dec. 12, 2002

(65) Prior Publication Data

US 2003/0111871 A1 Jun. 19, 2003

(30) Foreign Application Priority Data

Dec. 13, 2001 (DE) .......................... 101 61 476

(51) Int. Cl.⁷ ................................................. B60J 7/00
(52) U.S. Cl. .................... 296/216.07; 348/837; 312/7.2
(58) Field of Search ............. 296/37.7, 216.07–216.08; 348/837; 312/7.2; 353/13

(56) References Cited

U.S. PATENT DOCUMENTS

| | | | |
|---|---|---|---|
| 5,303,970 A | * 4/1994 | Young et al. ............ | 296/37.7 |
| 5,667,896 A | 9/1997 | Carter et al. | |
| 5,822,023 A | 10/1998 | Suman et al. | |
| 5,946,055 A | 8/1999 | Rosen | |
| 6,019,411 A | * 2/2000 | Carter et al. ............ | 296/37.7 |
| 6,065,793 A | * 5/2000 | Koshida et al. ......... | 296/37.1 |
| 6,267,428 B1 | * 7/2001 | Baldas et al. ........... | 296/37.7 |
| 6,292,236 B1 | 9/2001 | Rosen | |
| 6,338,517 B1 | * 1/2002 | Canni et al. ............ | 296/37.7 |

FOREIGN PATENT DOCUMENTS

| | | |
|---|---|---|
| DE | 44 06 872 A1 | 10/1998 |
| DE | 101 11 453 A1 | 9/2001 |
| EP | 0 719 667 A1 | 7/1996 |
| EP | 0 950 554 A1 | 10/1999 |
| JP | 10-315781 | * 12/1998 |

* cited by examiner

Primary Examiner—Dennis H. Pedder
(74) Attorney, Agent, or Firm—Nixon Peabody LLP; David S. Safran

(57) ABSTRACT

A roof unit (3) for installation in an opening formed in a motor vehicle roof (3) and which has a transparent area and/or a roof opening which can be closed with an openable cover. At least one screen (11) is integrated into the bottom part (7) of the roof unit (3) facing the motor vehicle interior, in the installed state, and the at least one screen can be moved, especially swung down, into a position of use out of a rest position in which the screen lies flat in the bottom part (7).

17 Claims, 5 Drawing Sheets

US 6,789,843 B2

ROOF UNIT FOR INSTALLATION IN A MOTOR VEHICLE ROOF

BACKGROUND OF THE INVENTION

1. Field of the Invention

The invention relates to a roof unit which is intended for installation in an opening formed in a motor vehicle roof and which has a transparent area and/or a roof opening which can be closed with an openable cover, and to a motor vehicle with such a roof unit.

2. Description of Related Art

A roof unit of the type to which the invention is directed is also called an "after-market roof" and is known, for example, from published European Patent Application EP 0 719 667 B1. It is installed in an opening which is made subsequently in a fixed motor vehicle roof surface so that the vehicle passengers can enjoy the advantages of a transparent roof area or an at least partially exposeable roof opening, even when the motor vehicle roof was originally manufactured as closed roof.

Furthermore, an increase in the utility of motor vehicles has enabled passengers to view movies or play video games. For this purpose, U.S. Pat. No. 5,946,055 discloses a display unit for a motor vehicle which has a flat panel screen which is pivotally mounted on a housing. The housing is attached to the underside of the motor vehicle roof. The screen can be pivoted around a transverse axis from a rest position in which it is held lying flat at least partially in the housing, and a position of use in which it projects down from the housing. The housing which contains the flat panel screen is attached to the motor vehicle roof in a position such that the folded-down flat panel screen is suitable for viewing by the passengers in the rear seat of a passenger car.

In the ceiling mounted monitor unit disclosed in U.S. Pat. No. 6,292,236 B1, the housing is located above the seat of the front seat passenger so that both the front seat passenger and also passengers on the rear seats can view the flat panel screen. The installation of such a monitor unit in which the housing is attached to the underside or inner side of the fixed motor vehicle roof can take place either in the production of the motor vehicle or even afterwards. However, retrofit installation can be a problem if there are no suitable anchoring points on the motor vehicle roof or motor vehicle headliner which enable permanent mounting, or they can only be found with difficulty.

SUMMARY OF THE INVENTION

The primary object of the present invention is to devise roof unit of the initially mentioned type which, besides the known advantages with respect to light incidence and ventilation possibilities, offers other possibilities for use, and a motor vehicle with such a roof unit.

The object is achieved in the aforementioned roof unit in accordance with the invention in that at least one screen is integrated on the underside of the roof unit facing the motor vehicle interior, in the installed state, which can be moved out of a rest position which is flat in the bottom part into a position of use, especially swung down. In this way, with subsequent installation of the roof unit, at the same time, a screen can be attached in the motor vehicle interior without additional attachment being necessary for this purpose. If necessary, the screen which is otherwise, for example, located largely or entirely countersunk is moved into its position of use.

Preferably, on the roof unit, a unit is integrated for preparation and processing of data or information and for the information to be displayed by the screen so that with subsequent installation of the roof unit, data lines to remote data devices, such as DVD players or video machines are not necessary.

Furthermore, there can be a control unit for data display on the roof unit and it can be at least coupled to the latter. The control unit is held, especially countersunk, on the roof unit and can be removed by the user, its being connected, for example, by means of a signal cable or a remote control to the information processing means or the screen.

If the bottom part of the roof unit is formed by one of several interchangeable parts which have different configurations, by subsequent replacement, the bottom part which has been made as desired with one or more screens and the corresponding data storage means, such as DVD players or the like, can be attached.

Feasibly the screen is a flat panel screen for reasons of space.

A roof unit in accordance with embodiments of the invention is explained in detail low with reference to the accompanying drawings.

DETAILED DESCRIPTION OF THE DRAWINGS

Figure 1:
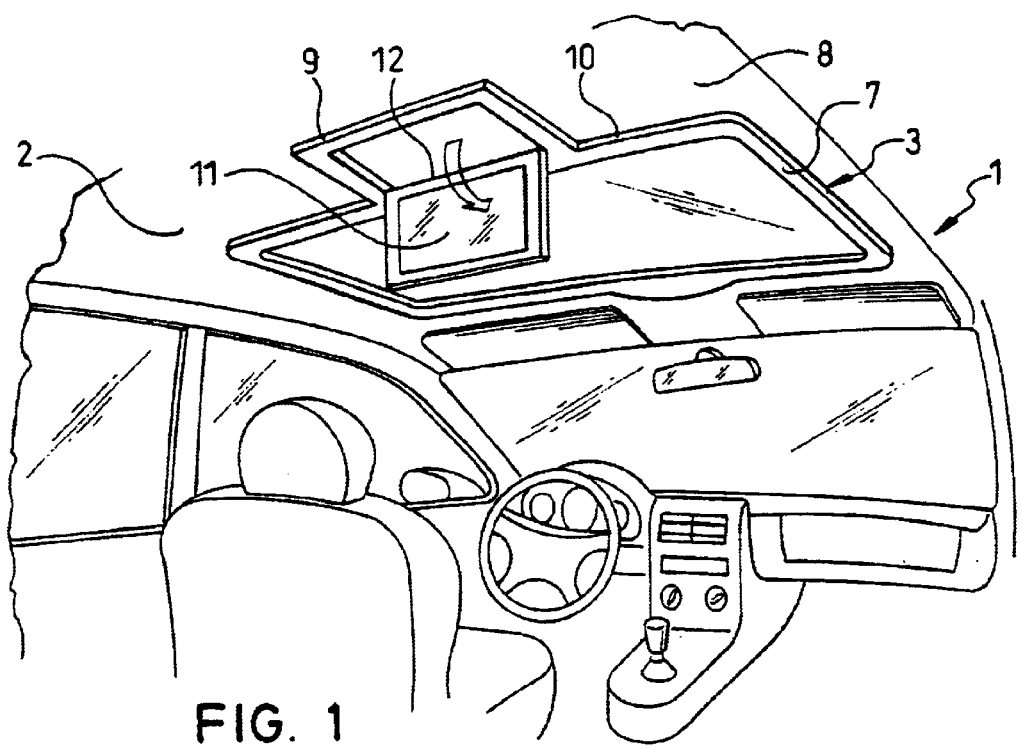
FIG. 1 is a perspective view of a motor vehicle interior with a roof unit in accordance with the invention with a swung-down screen.

A passenger car 1 of conventional design (see FIGS. 1 & 2) with, for example, two rows of seats has a fixed motor vehicle roof 2 in which a roof unit 3 is retrofit installed. To do this, an opening is made in the fixed motor vehicle roof 2, for example, by cutting or sawing, which is matched to the size of the roof unit 3 to be attached, and is made especially right-angled, in order, for example, to place a roughly rectangular transparent top roof part 4 of the roof unit 3 in or on the opening, the upper peripheral sealing frame 5 of the roof part 4 coming to rest on the edge of the motor vehicle roof 2 surrounding the opening. On the underside or inner side of the motor vehicle roof 2, there is a mounting frame 6 which is permanently joined to the roof part 4 so that the roof unit 3 is attached permanently and tightly to the motor vehicle roof 2.

A frame-like inner covering 7, which forms the bottom of the roof unit 3, is attached to the underside or inner side of the motor vehicle roof 2 and is fixed on the mounting frame 6 so that it covers the mounting frame 6 and forms an visually perfect transition to the bottom of the roof or to the motor vehicle headliner 8.

Figure 2:
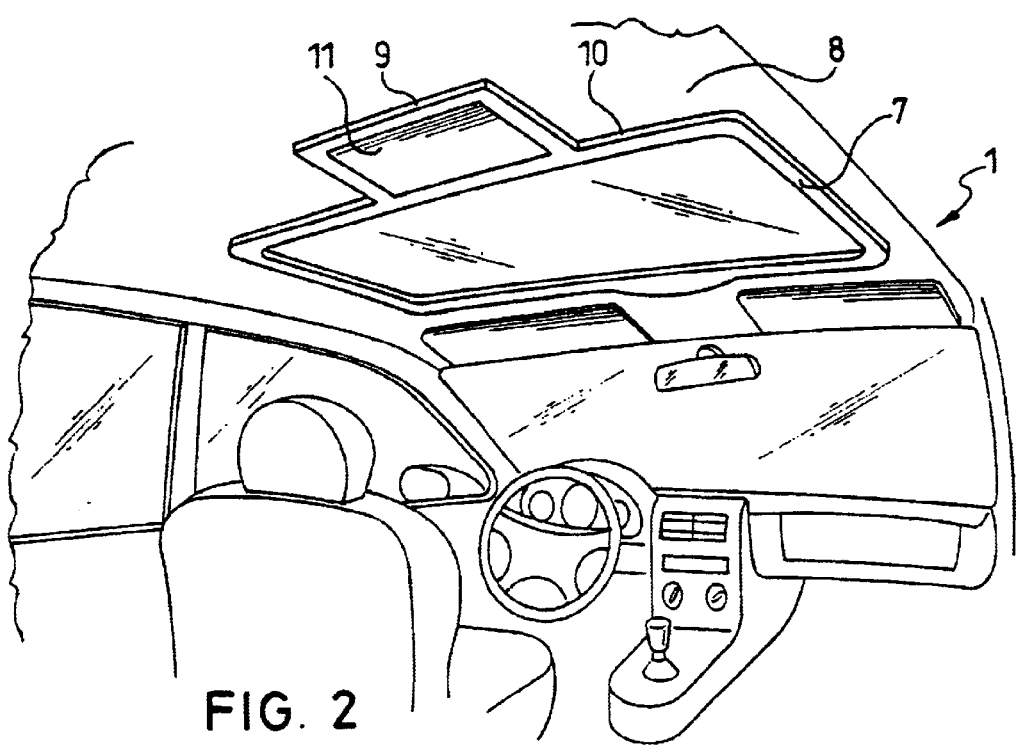
FIG. 2 is a perspective view of a motor vehicle interior with a roof unit with the screen swung up.

According to the embodiment shown in FIGS. 1 & 2, the inner covering 7 contains, for example, a roughly rectangular frame extension 9 which extends to the rear from the middle of the rear transverse edge 10 of the inner cover 7. In the frame extension 9, a flat panel screen 11 is supported to be able to pivot around a pivot axis, so that it can be pivoted out of its rest position (FIG. 2), in which it is raised essentially into the frame extension 9, and thus, is located flush with the entire mounting frame 6, into its position of use (FIG. 1) in which it is pivoted down around its front or top edge 12 on which the pivoting axis runs which is formed, for example, by two bearing journals which project laterally from the flat panel screen 11, into an arrangement which is, if necessary, for example, pointed vertically or obliquely forward. The flat panel screen 11 is thus in a favorable alignment so that the information displayed on the flat panel screen 11 can be viewed by passengers from the rear seats.

If the inner covering 7 forming the bottom part of the roof unit 3 is formed by one of several interchangeable parts which have different configurations, by subsequent replacement, the bottom part which has been made as desired with one or more screens and the corresponding data storage means, such as DVD players or the like, can be attached. Thus, since the frame extension 9 extends in the plane of the inner covering 7 and thus over the inner side or the headliner 8 of the motor vehicle roof 2, the flat panel screen 11 does not need its own cut-out on the inner side or on the headliner 8 of the motor vehicle roof 2, so that attachment of the flat panel screen 11 is easily possible. Thus, a flat panel screen 11 can also be subsequently attached to such a roof unit 3 which is already mounted on the motor vehicle roof 2 by replacing the original inner covering which does not contain a flat panel screen 11 with the described inner covering 7.

Figure 3:
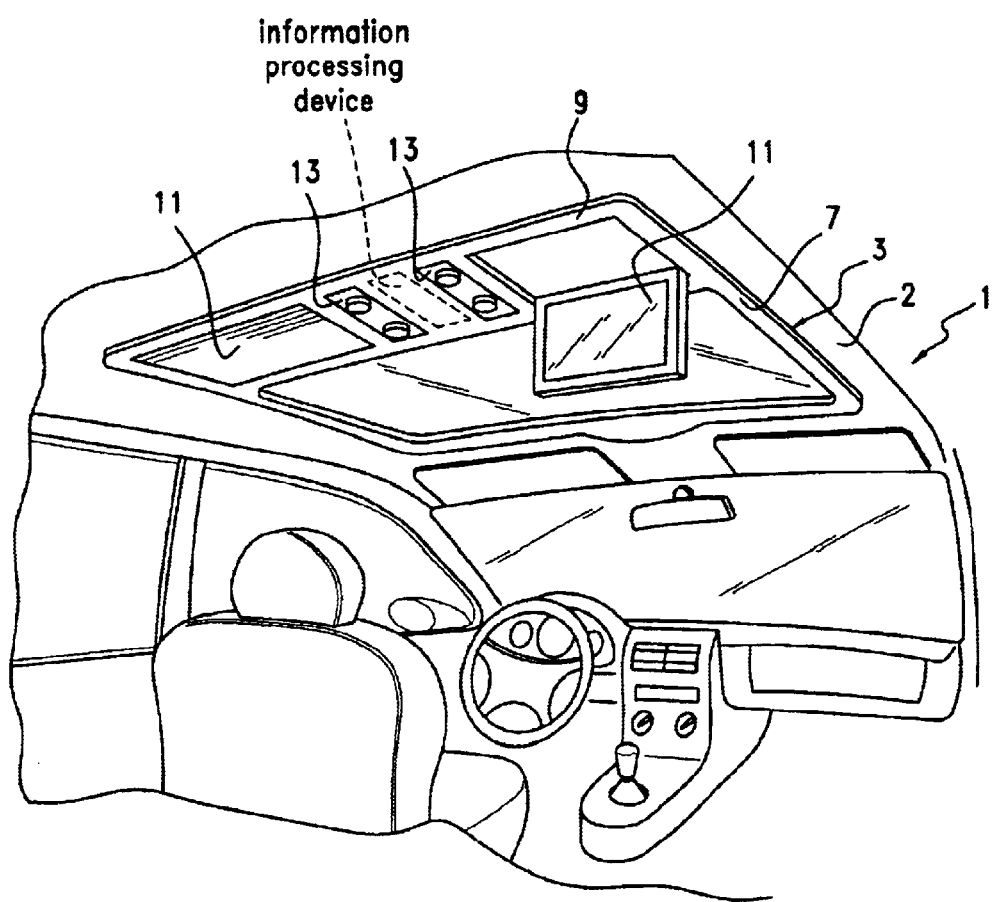
FIGS. 3 & 6 are perspective views of two embodiments of a motor vehicle interior with a roof unit which contains two screens.
Figure 4:
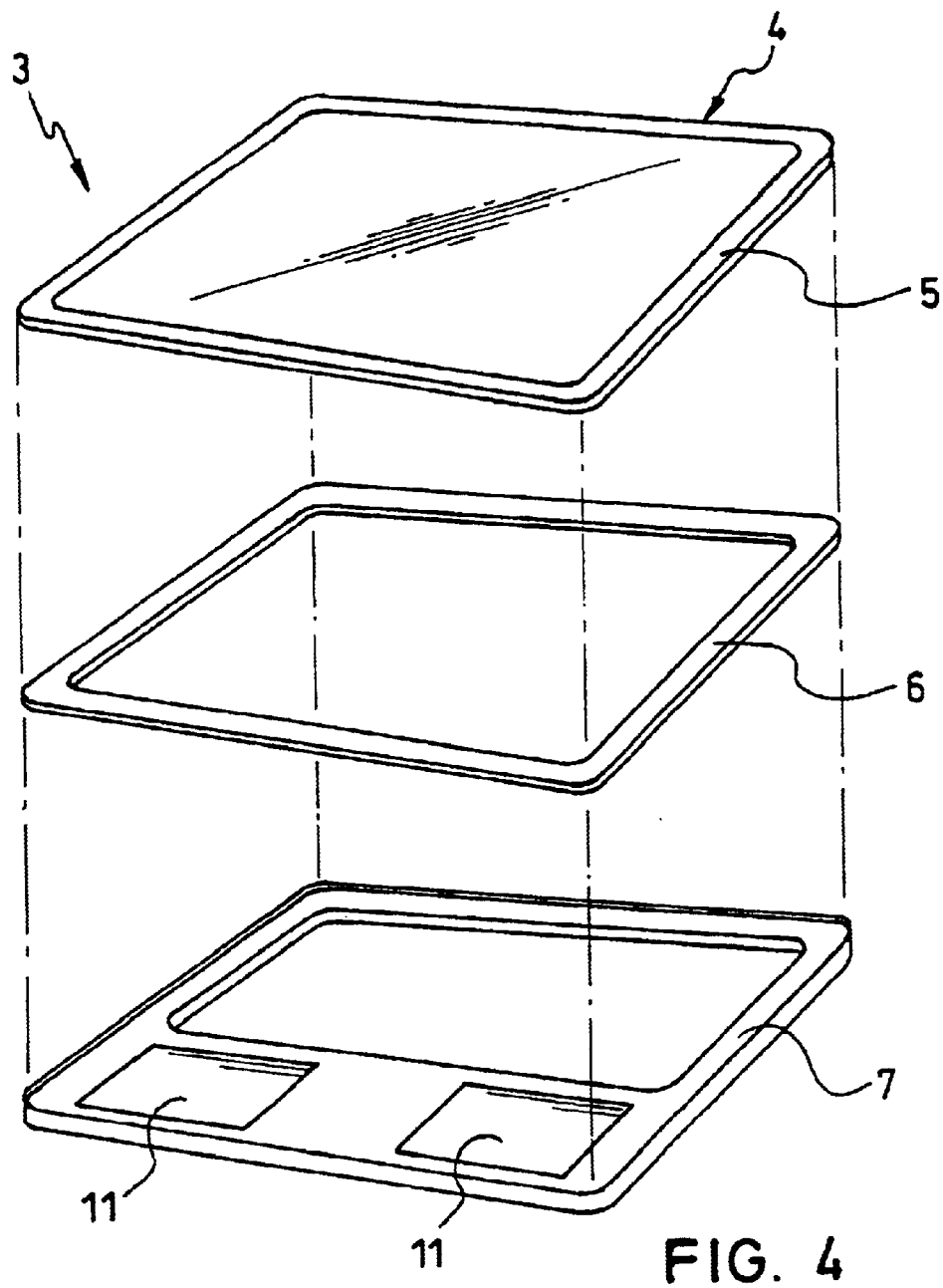
FIGS. 4 & 5 show two embodiments of the roof unit in exploded views.
Figure 5:
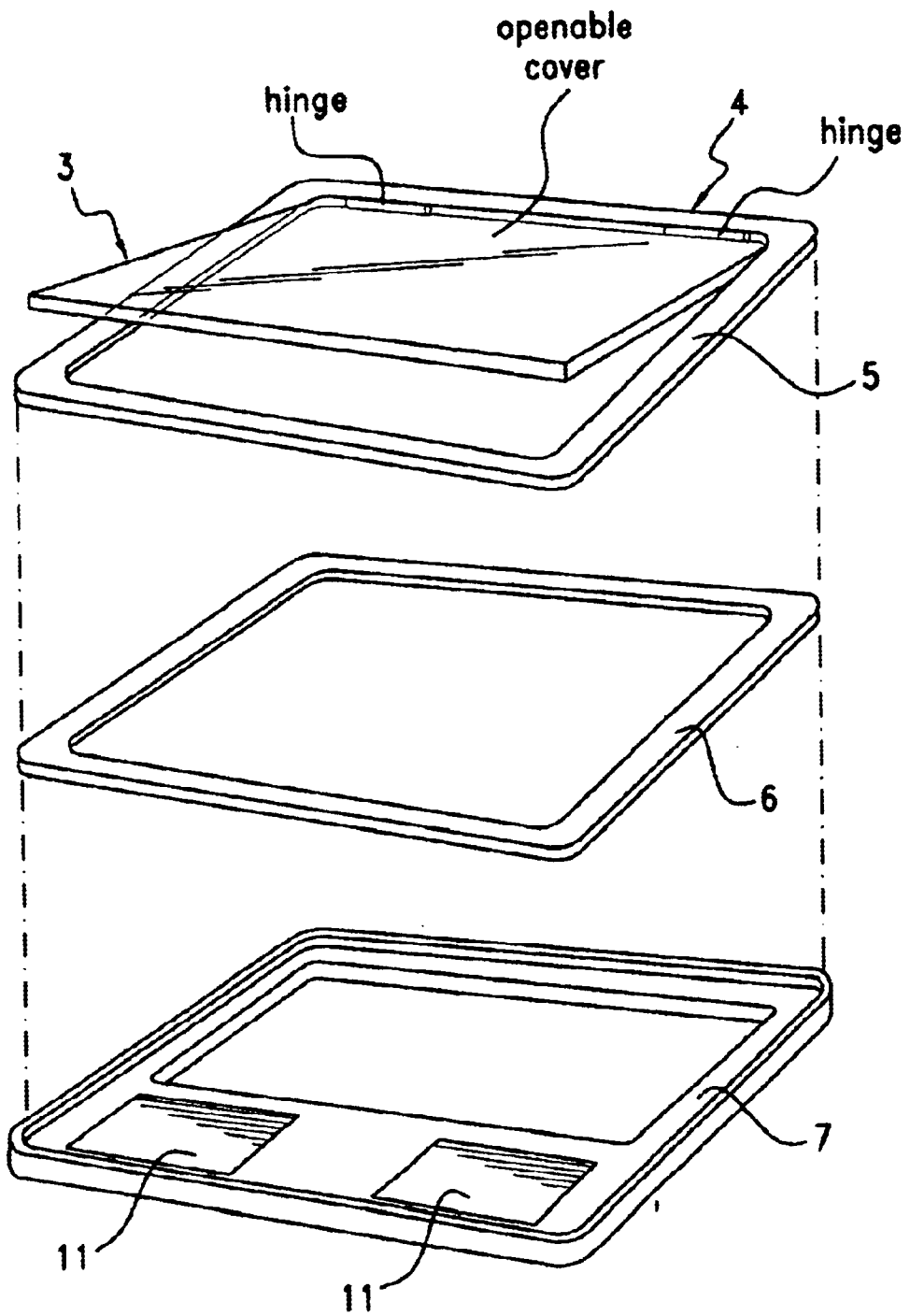
Figure 6:
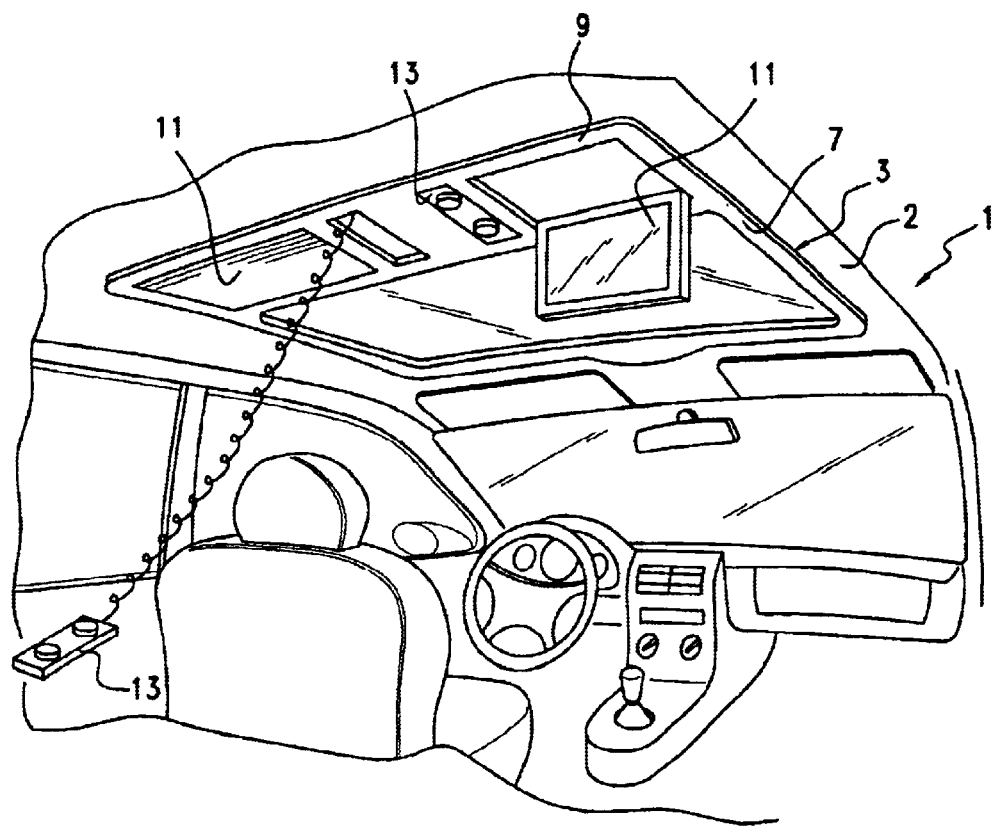

In the roof unit 3 which is shown in FIG. 3, the inner covering 7 contains a rear frame extension 9 which extends over the entire width of the inner covering 7, and in which two flat screens 11 are located next to one another and are supported to be able to pivot in the already described manner. Thus, two passengers on the back seats selectively and independently of one another can use their respective flat panel screen 11 and watch images, for example, of television programs or movies from video or DVD media, or can play video games.

A control arrangement 13 for controlling the screen as well as for program selection or game control can be provided for each flat panel screen 11 and is located, for example, countersunk in the inner covering 7 and is connected via a cable link or wireless connection to the inner covering or the screen and/or to the data source as well as to a television receiver located in the vehicle or a video recorder.

In an alternative embodiment, the frame extension is formed from the rear edge of the inside cover in the direction from its front edge so that the frame extension in which at least there is a flat panel screen is located underneath the transparent roof part and does not extend over the headliner under the motor vehicle roof. Thus, higher installation space for the screen or for auxiliary devices is available in the inner covering or the frame extension.

Instead of a permanently fixed sunroof part, the roof unit can also have a movable cover which can be raised at its rear edge to provide for ventilation of the vehicle.

What is claimed is:

1. Roof unit for installation in an opening formed in a motor vehicle roof, comprising a roof unit which has a frame assembly for mounting to the vehicle roof, a transparent panel area within said frame assembly, a bottom part which is adapted to face into a motor vehicle interior in an installed state, and at least one screen which is integrated into the bottom part and is movable into a position of use from a rest position in which the at least one screen lies flat in the bottom part;

wherein the bottom part of the roof unit is selectively formed by one of several bottom parts of different configurations that are interchangeably usable with the frame assembly.

2. Roof unit as claimed in claim 1, wherein the transparent panel area comprises a roof opening in which an openable cover is movably disposed.

3. Roof unit as claimed in claim 2, wherein an information processing device for providing information to be displayed by the at least one screen is integrated into the roof unit.

4. Roof unit as claimed in claim 3, wherein a control unit for the screen and for the information processing device is provided on the roof unit.

5. Roof unit as claimed in claim 3, wherein the control unit is countersunk in the roof unit and is user removable therefrom.

6. Roof unit as claimed in claim 3, wherein the control unit is connected by one of a signal cable and a remote control to one of the information processing means and the screen.

7. A Roof unit as claimed in claim 6, wherein the screen is a flat panel screen.

8. Roof unit as claimed in claim 1, wherein an information processing device for providing information to be displayed by the at least one screen is integrated into the roof unit.

9. Roof unit as claimed in claim 8, wherein a control unit for the screen and for the information processing device is provided on the roof unit.

10. Roof unit as claimed in claim 9, wherein the control unit is countersunk in the roof unit and is user removable therefrom.

11. Roof unit as claimed in claim 9, wherein the control unit is connected by one of a signal cable and a remote control to one of the information processing means and the screen.

12. Roof unit as claimed in claim 1, wherein the screen is a flat panel screen.

13. Motor vehicle with a roof unit in an opening formed in a roof of the motor vehicle, the roof unit having a frame assembly, a transparent panel area within sad frame assembly, a bottom part which faces into a passenger compartment of the motor vehicle, and at least one screen which is integrated into the bottom part and is movable into a position of use from a rest position in which the at least one screen lies flat in the bottom part, wherein the bottom part of the roof unit is selectively formed by one of several bottom parts of different configurations that are interchangeably mountable to the frame assembly while the roof unit is mounted on the motor vehicle roof.

14. Motor vehicle as claimed in claim 13, wherein the transparent panel area comprises a roof opening in which an openable cover is movably disposed.

15. Motor vehicle as claimed in claim 13, wherein an information processing device for providing information to be displayed by the at least one screen is integrated into the roof unit.

16. Motor vehicle as claimed in claim 15, wherein a control unit for the screen and for the information processing device is provided on the roof unit.

17. Motor vehicle as claimed in claim 16, wherein the control unit is countersunk in the roof unit and is user removable therefrom.

* * * * *